Patented Mar. 12, 1940

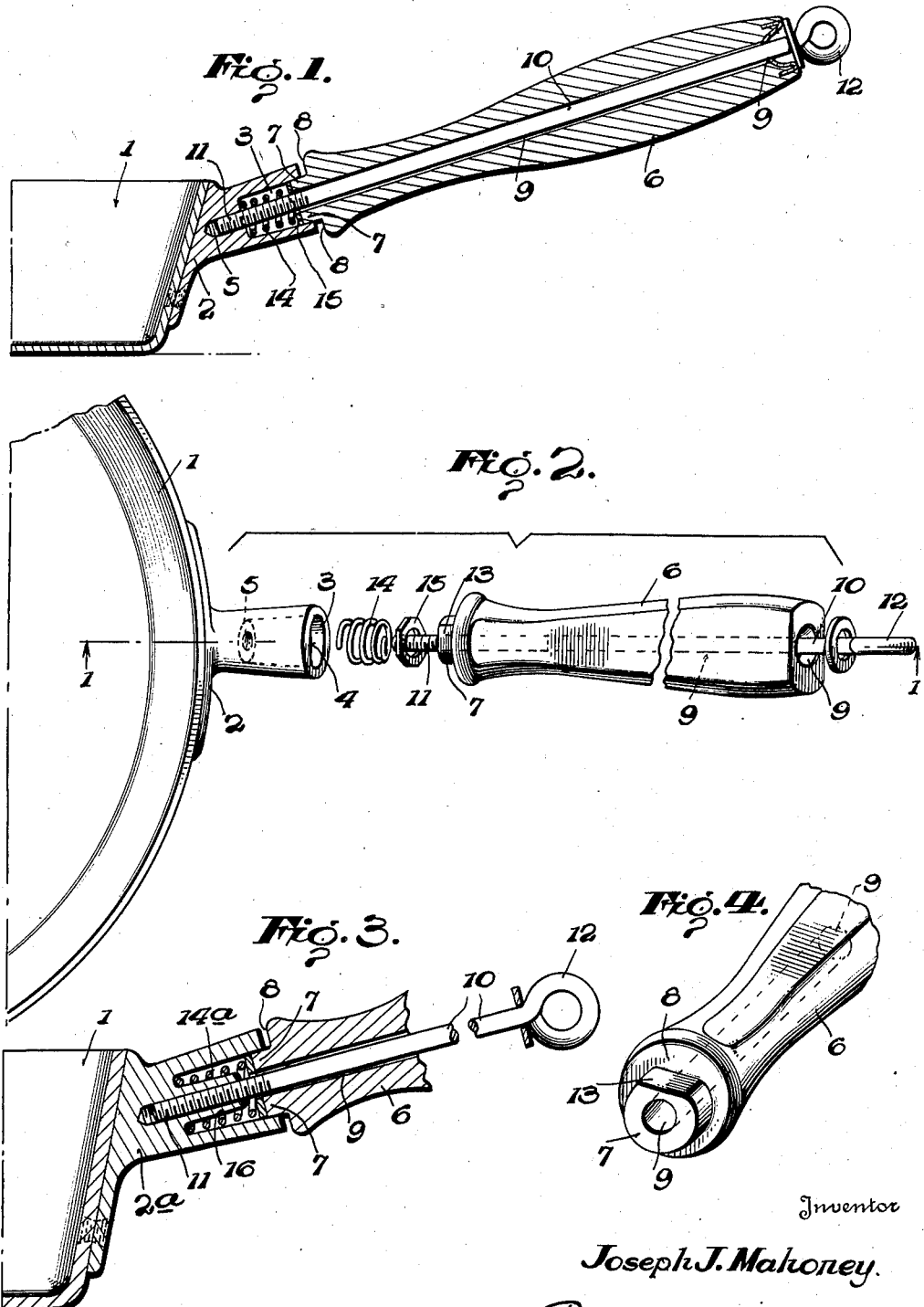

2,193,290

UNITED STATES PATENT OFFICE 2,193,290

HANDLE FOR COOKING UTENSILS

Joseph J. Mahoney, Washington, D. C., assignor, by mesne assignments, to Joseph J. Mahoney and Nellie M. Mahoney, Washington, D. C.

Application May 23, 1939, Serial No. 275,306

2 Claims. (Cl. 16—114)

Cooking utensils, such as frying pans, saucepans and the like, usually have a metal socket secured to the side wall thereof into which a wooden handle is fitted, and from experience it has been found that that portion of the handle within the socket shrinks due to the intense heat to which it is subjected, as a result of which the utensil, when lifted by such handle, turns on the handle resulting in the dumping of the contents from the utensil which may result in a fire or injury to the user.

The primary object of my invention is to provide means to prevent the utensil from turning relatively to the handle.

My invention consists of means to lock the handle and utensil together against relative turning movement.

In the drawing:

Figure 1 is a vertical sectional view of a cooking utensil on the line 1—1, Figure 2, parts being in elevation and parts being broken away.

Figure 2 is a perspective view of the handle and its lock and a portion of the utensil, the parts being shown in position for assembly.

Figure 3 is a detail vertical sectional view of the utensil and handle showing another embodiment.

Figure 4 is a detail perspective view of the handle.

The reference numeral 1 designates a cooking utensil of any approved type, to the side wall of which is secured a bracket 2 provided with a socket 2 having a portion of its inner face flat as at 4.

In the bottom wall of the socket 3 is a screw threaded hole 5.

The handle 6 is provided at its inner end with a projection 7 and with a shoulder 8. The handle is further provided with a bore 9 extending throughout thereof and open at each end.

The rod 10 is provided at one end with screw threads 11, and at the other end with an eye 12, and to secure the handle 6 to the utensil the projection 7 of the handle is inserted in the socket 3, then the rod 10 is passed through the bore 9 of the handle and then revolved by its eye 12 whereby the screw end 11 of the rod is screwed into the threaded opening 5 in the bottom of the socket, the flat portion 13 of the projection 7 engaging the flat portion 4 of the socket.

The construction which I have thus far described is old, but such construction is open to the objections hereinbefore noted, because the intense heat to which the parts are subjected to when in use causes the projection 7 to materially shrink, and to such an extent actual use has demonstrated the flat portion 4 of the socket and the flat portion 13 of the projection 7 become spaced and no longer function to prevent the utensil turning relatively to the handle.

By my invention I insert in the socket 3 a coiled spring 14, one end of which is seated in the bottom of the socket while its other end bears upon a washer 15, and the end of the projection 7 bears upon the washer. With the parts in position the rod 10 is revolved in the threaded opening 5 until the spring 14 is put under considerable tension which results (as has been found in actual use) in locking the handle and utensil together firmly against relative turning movement notwithstanding the shrinkage of the projection 7.

By disposing the spring 14 in the socket of the metallic bracket member the necessity of chambering and weakening the handle for its reception is avoided. The handle itself is necessarily weakened by the provision of the bore 9, which is compensated for by the reinforcing action of the rod 10, but by disposing the spring in the socket the necessity of further weakening the handle is obviated. At the same time the spring is perfectly housed and protected against injury so that it will always be in condition for a most effective action. As the spring surrounds the threaded end of the rod and bears at one end against the inner wall of the socket and at its other end against the abutment washer, it not only tends to reinforce the threaded end of the rod against bending motion and thereby relieve the tang 7 from strain under the supported weight of the utensil and its contents but, as its expansive force is exerted outwardly on the handle 6 and eye 12, and hence, on the rod 10, the threads of the rod are held tightly in binding contact against the threads of the recess 5 which it engages, thus preventing casual turning and loosening of the rod 10, so that any looseness of the threads will be taken up to hold the handle from outward endwise movement and the tang tightly seated in the socket.

In Figure 3 I have shown another embodiment of my invention which consists in providing the socket 2a with a projection 16 around which the spring 14a is positioned.

It is, of course, understood that the handle is preferably of suitable heat insulating material.

What I claim is:

1. In a handle fastening, a bracket having an inwardly tapering socket and a threaded recess opening thereinto in axial alinement therewith, a handle having a longitudinal bore extending therethrough and provided at its inner end with a tapered tang non-rotatably but slidably fitted in the socket of the bracket and a shoulder arranged in rear of the tang and adapted to engage the outer end of the bracket to limit the movement of the tang into the socket, a rod extending through the bore of the handle and having a threaded inner end engaging the recess in the socket, an abutment at the outer end of the rod engaged by the outer end of the handle, and a coiled expansion spring in the socket exerting its expansive energy to hold the handle pressed against the abutment and the tang pressed outwardly in the socket, the threaded end of the rod being normally spaced from the inner end of the recess and the shoulder being normally cooperatively spaced from the bracket, whereby in the event of the tang shrinking and becoming loose in the socket the rod may be adjusted in the socket to force the tang into a tight wedging fit therein and the spring simultaneously tensioned to clamp the handle between the same and the abutment at the outer end of the rod.

2. In a handle fastening, a bracket having an inwardly tapering socket and a boss projecting from the inner end of the socket outwardly thereinto in axial alinement therewith, said boss being provided with a threaded recess, a handle having a longitudinal bore extending therethrough and provided at its inner end with a tapered tang non-rotatably but slidably fitted in the socket of the bracket and a shoulder arranged in rear of the tang and adapted to engage the outer end of the bracket to limit the movement of the tang into the socket, a rod extending through the bore of the handle and having a threaded inner end engaging the recess in the boss, an abutment at the outer end of the rod engaged by the outer end of the handle, and a coiled expansion spring disposed in the socket about the boss and between the inner end of the socket and inner end of the handle and exerting its expansive energy to hold the handle pressed against the abutment and the tang pressed outwardly in the socket, the threaded end of the rod being normally spaced from the inner end of the recess and the shoulder being normally cooperatively spaced from the bracket, whereby in the event of the tang shrinking and becoming loose in the socket the rod may be adjusted in the socket to force the tang into a tight wedging fit therein and the spring simultaneously tensioned to clamp the handle between the same and the abutment at the outer end of the rod.

JOSEPH J. MAHONEY.